(12) United States Patent
Fukuta

(10) Patent No.: US 7,581,123 B2
(45) Date of Patent: Aug. 25, 2009

(54) RECORDING MEDIA DRIVE PROVIDED WITH A CONNECTING PIN FOR SUPPLY OF 3.3V

(75) Inventor: Masaru Fukuta, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 373 days.

(21) Appl. No.: 11/228,860

(22) Filed: Sep. 16, 2005

(65) Prior Publication Data
US 2006/0077633 A1 Apr. 13, 2006

(30) Foreign Application Priority Data
Sep. 29, 2004 (JP) ............... 2004-283753

(51) Int. Cl.
G06F 1/00 (2006.01)
G06F 11/30 (2006.01)
H02P 1/54 (2006.01)
(52) U.S. Cl. .................. 713/300; 713/340; 318/62
(58) Field of Classification Search .......... 713/300, 713/340
See application file for complete search history.

(56) References Cited
U.S. PATENT DOCUMENTS
5,784,105 A * 7/1998 Kawamura ............ 348/372
6,841,954 B2 * 1/2005 Nakabayashi ........... 318/62
2004/0212332 A1 * 10/2004 Nakabayashi ........... 318/62

FOREIGN PATENT DOCUMENTS
JP 07-253831 A 10/1995
JP 08045175 A * 2/1996
JP 2004070603 A * 3/2004

* cited by examiner

Primary Examiner—Suresh K Suryawanshi
(74) Attorney, Agent, or Firm—Townsend and Townsend and Crew LLP; Darren Gold

(57) ABSTRACT

A recording media drive is to be provided in which, when even a voltage capable of being provided in the interior can be provided from the exterior, e.g., the voltage of 3.3V defined in Serial ATA Standard, the voltage can be supplied from the exterior. In one embodiment, a circuit board which controls positioning of a head of an HDD includes a connector connected to an external voltage 5V supply segment and also to an external voltage 12V supply segment, a regulator which generates 3.3V from an external voltage of 5V supplied through the connector, an electronic part capable of being supplied with the 3.3V from the regulator, and a switching control circuit for switching to a voltage supply segment for the supply of 3.3V to the electronic part. In the case where the connector is constructed so as to be connectable to an external voltage 3.3V supply segment for the supply of an external voltage of 3.3V and when it is connected to the external voltage 3.3V supply segment, the switching control circuit performs a switching control so that the external voltage of 3.3V is supplied to the electronic part.

15 Claims, 7 Drawing Sheets

RECORDING MEDIA DRIVE PROVIDED WITH A CONNECTING PIN FOR SUPPLY OF 3.3V

CROSS-REFERENCES TO RELATED APPLICATIONS

This application claims priority from Japanese Patent Application No. JP2004-283753, filed Sep. 29, 2004, the entire disclosure of which is incorporated herein by reference.

BACKGROUND OF THE INVENTION

The present invention relates to a recording media drive having a circuit board mounted thereon and suitable for a hard disk drive (hereinafter referred to as "HDD") and other electronic devices, the circuit board mounting thereon electronic parts adapted to operate at mutually different voltages.

Devices using various types of media such as optical disks and magnetic tapes are known as recording media drives provided inside or outside information processing apparatuses. Among them, hard disk drives (HDDs) have become popular as storage devices for computers to such an extent that they are one of the storage devices indispensable for today's computers. Further, not limited to computers, their application is widening more and more due to the superior characteristics with the advent of moving picture recording/reproducing devices, car navigation systems, digital cameras, removable memories used therein and so on.

Each magnetic disk used in HDDs has a plurality of tracks formed concentrically and each track is partitioned into a plurality of sectors. In each sector, sector address information and user data are stored. Either data write to a sector or data read from the sector is enabled by a magnetic head which accesses the desired sector according to the sector address information. A signal read out from a magnetic disk through data read operation is subjected to waveform shaping, decoding processing and other prescribed signal processing by a signal processing circuit on a HDD circuit board before being transmitted to the host. Likewise, data transferred from the host is subjected to prescribed signal processing by a signal processing circuit and then written to the magnetic disk.

The circuit board is supplied with a supply voltage from a host device (hereinafter referred to as "host") such as a desktop or notebook type personal computer provided with the HDD. For the purpose of reducing power consumption and reducing unnecessary electromagnetic radiation, the operating voltage of the host is changing from the conventional 5V to a lower level of 3V to 3.3V. Therefore, many information processing apparatuses such as PC available recently have a voltage supply segment of 3.3V.

On the other hand, the circuit board of the HDD also carries an electronic part such as a logic circuit which operates at 3.3V. However, a conventional host and HDD supplied with electric power from the host have only power pins for the supply of 5V and 12V and thus it has so far been impossible for the HDD to be supplied with 3.3V from the host. To avoid this inconvenience, the conventional HDD circuit board is provided with, for example, a sub-power segment for the conversion of 5V to 3.3V in order to activate an electronic part mounted on the circuit board and adapted to operate at 3.3V (see Patent Document 1, Japanese Patent Laid-Open No. Hei 7(1995)-253831).

According to the technique described in Patent Document 1, a DC-DC converter as a sub-power segment and a fuse as a protective means are provided on a circuit board. A supply voltage of 5V supplied through a power connector is converted to 3.3V by the DC-DC converter and this electric power is fed to an electronic part which operates at 3.3V.

As an interface provided for data transmission between HDD and host, there usually is employed SCSI (Small Computer System Interface) or ATA (AT Attachment) interface. Particularly, ATA interface is utilized in many computers from the standpoint of improving the interface function and reducing the cost. It is also widely utilized as an interface of other types of storage devices such as, including optical disk storage devices.

With the recent demand for improvement in recording density and performance of storage media, the request for the data transmission speed of ATA interface is becoming more and more strict. To meet such a strict request, an ATA interface (Serial ATA) using serial transmission has been proposed instead of the conventional parallel transmission method.

The standard of Serial ATA is being established by "Serial ATA Working Group." In comparison with the conventional Parallel ATA, Serial ATA is high in transfer speed and permits the reduction in size of connector cable, so that a thermal design of the entire system is also improved.

At present, mother boards conforming to Serial ATA Standard are being supplied from plural venders and so are HDDs conforming to SATA Standard from plural manufacturers, and thus both Parallel ATA and Serial ATA are mixed on the market. In "Serial ATA II: Extensions to Serial ATA 1.0 Specification" already released, there are adopted several techniques not found in the conventional Parallel ATA.

For example, in Parallel ATA, the use of only 5V and 12V is permitted, while in Serial ATA the use of 3.3V is permitted in addition of 5V and 12V. Therefore, Serial ATA is provided with a connecting pin for the supply of 3.3V. Thus, for the connector of an HDD conforming to Serial ATA Standard, there is provided a connecting pin so as to be supplied with 3.3V.

BRIEF SUMMARY OF THE INVENTION

In Parallel ATA, however, the use of 3.3V has not been defined as a standard, so that in a host corresponding to an HDD which conforms to Parallel ATA Standard it is impossible to supply 3.3V to an HDD conforming to Serial ATA. It is therefore impossible to predict whether the host is in conformity with Serial ATA Interface or not. Consequently, even in the case of an HDD conforming to Serial ATA, 3.3V is not supplied or cannot be supplied from the host and, as in the foregoing Patent Document 1, there is adopted a method in which 3.3V is produced from external 5V with use of a DC-DC converter provided on the circuit board.

On the other hand, also on the host side, as noted above, one conforming to Serial ATA and constructed so as to permit the supply of 3.3V to an HDD has begun to be sold. On the HDD side, it is not necessary to convert 5V internally to 3.3V insofar as the HDD used can be supplied with 3.3V from the host side, and there is an increasing demand from the user side for making direct supply of 3.3V from the host side possible. In case of converting, for example, 5V to 3.3V with use of the circuit board on the HDD side, surplus electric power is usually released as heat and therefore, in an information system using several tens of HDDs at a time, e.g., server, the amount of heat generated becomes very large to an unignorable extent, thus giving rise to a problem.

It is difficult for the HDD supplier side to estimate beforehand whether the host concerned is in conformity with Serial ATA or Parallel ATA. To offer an HDD which can cope with both types, there arises the necessity of manually changing the design such that 3.3V is received directly when the host is in conformity with Serial ATA, while when the host is not in conformity with Serial ATA, the circuit board of the HDD used is caused to produce 3.3V from 5V. However, this operation is complicated.

The present invention has been accomplished for solving the above-mentioned problems and it is a feature of the invention to provide a recording media drive capable of being supplied with voltage from the exterior when it is possible to make the external supply of voltage even in the case where the voltage can be provided in the interior. It is another feature of the present invention to provide a recording media drive which can make, for example, the voltage of 3.3V defined in Serial ATA Standard employable irrespective of whether the host side is in conformity with Serial ATA Standard or not. It is a further feature of the present invention to reduce the power consumption of a recording media drive.

A recording media drive according to an aspect of the present invention comprises a recording media drive body and a circuit board mounted on the recording media drive body. The circuit board comprises a connector connected to a first external voltage supply segment for the supply of a first external voltage and capable of being connected to a second external voltage supply segment for the supply of a second external voltage, a second internal voltage supply segment which generates a second internal voltage from the first external voltage supply from the connector, an electronic part adapted to operate at a second voltage, and a switching control circuit which makes control so as to supply the second voltage to the electronic part from either the first external voltage supply segment or the second internal voltage supply segment, wherein the switching control circuit makes a switching control so that the second external voltage is supplied to the electronic part upon detecting the connection of the connector to the second external voltage supply segment.

Thus, there is provided a control function for switching between the case where the second voltage is generated in the interior from the first external voltage and the case where the second voltage is supplied from the exterior, and the second external voltage is selected upon detecting that the second external voltage can be supplied. In this way the second voltage can be obtained without performing in the interior the processing for generation of the second voltage.

The second internal voltage supply segment may be constructed so as to generate the second internal voltage from the first or the third external voltage. In the case where plural magnitudes of voltages are supplied, the second voltage can be produced from at least one external voltage.

The recording media drive may further comprise another electronic part adapted to operate at the first external voltage or another electronic part adapted to operate at the third external voltage.

A recording media drive according to another aspect of the present invention comprises a recording media drive body and a circuit board mounted on the recording media drive body. The circuit board comprises a connector connected to an external voltage 5V supply segment and an external voltage 12 volt supply segment and capable of being connected to an external voltage 3.3V supply segment, an internal voltage 3.3V supply segment which generates 3.3V from either an external voltage 5V or 12V supplied through the connector, an electronic part adapted to operate at 3.3V, and a switching control circuit which makes control so as to supply 3.3V to the electronic part from either the external voltage 3.3V supply segment or the internal voltage 3.3V supply segment, wherein the switching control circuit makes a switching control so that the external voltage 3.3V is supplied to the electronic part upon detecting the connection of the connector to the external voltage 3.3V supply segment.

Thus, whether 3.3V usually employed for circuit operation can be supplied from the exterior or not is detected automatically, and when the answer is affirmative, 3.3V can be supplied from the exterior. On the other hand, when the answer is negative, the 3.3V supply source is controlled switchingly so that 3.3V is provided in the internal voltage 3.3V supply segment. As a result, irrespective of whether an external host or the like which supplies electric power to a recording media drive can supply 3.3V or not, the recording media drive including a circuit board on which electronic parts adapted to operate at three different voltages of 3.3V, 5V, and 12V, are mounted, e.g., HDD, 3.3V can be supplied while ensuring the operation of an electronic part adapted to operate at 3.3V. When the 3.3V is supplied from the exterior, the power consumption can be made extremely low in comparison with the case where voltage conversion is performed in the interior.

The recording media drive may further comprise a first power line to which the external voltage 3.3V is supplied through the connector and a second power line to which the internal voltage 3.3V is supplied from the internal voltage 3.3V supply segment. The switching control circuit may comprise a first switch for connection between the electronic part and the first power line, a second switch for connection between the electronic part and the second power line, and a control circuit for controlling ON-OFF of the first and second switches.

The control circuit may comprise an external voltage detecting element for detecting whether the external voltage 3.3V is supplied or not, and can control ON-OFF of the first and second switches on the basis of the result of the detection performed by the external voltage detecting element.

The control circuit may comprise a first transistor which is ON-OFF controlled in accordance with whether the external voltage 3.3V is supplied or not and a second transistor which is ON-OFF controlled by the first transistor. The first and second transistors can control the second and first switches, respectively. The first transistor functions as an external voltage detecting element and the second transistor is turned ON or OFF in accordance with whether the first transistor is ON or OFF. Further, the switches can be controlled in accordance with whether the first and second transistors are ON or OFF.

In this case, the switching control circuit may be constructed such that the first and second switches are a third transistor and a fourth transistor, respectively, which are connected in series between the first and second power lines. The first transistor has a control terminal to which the first power line is connected and has one end to which control terminals of the second and fourth transistors are connected. The second transistor has one end to which a control terminal of the first transistor is connected. The external voltage 3.3V or the internal voltage 3.3V is outputted from the connection point between said third and fourth transistors. Thus, the switching control circuit can be constructed in a simple manner by combination of transistors.

The internal voltage 3.3V supply segment can generate the internal voltage 3.3V from the external voltage 5V. The connector may be a connector conforming to Serial ATA Interface.

A recording media drive according to another aspect of the present invention comprises a recording media drive body and a circuit board mounted on the recording media drive body. The circuit board comprises a connector connected to an external voltage 5V supply segment and an external voltage 12V supply segment and capable of being connected to an external 3.3V supply segment, an internal voltage 3.3V supply segment which generates 3.3V from either an external voltage 5V or 12V supplied through the connector, an electronic part adapted to operate at 3.3V, a first power line connected to the external voltage 3.3V supply segment through the connector, a second power line connected to the internal voltage 3.3V supply segment, a first switch having an ON-OFF control terminal connected to the first power line, a second switch adapted to be ON-OFF controlled by the first switch, a third switch for connecting the electronic part and the first power line with each other, and a fourth switch for connecting the electronic part and the second power line with each other. The third switch is ON-OFF controlled by the second switch, and the fourth switch is ON-OFF controlled by the first switch.

In the present invention, by such a simple construction as using the first to fourth switches, it is possible to automatically detect whether 3.3V is to be produced from the external voltage 5V or 12 or is to be supplied from the exterior, and make a switching control.

According to the recording media drive of the present invention, even a voltage capable of being provided in the interior can be supplied from the exterior if it is possible to do so. Moreover, 3.3V defined in Serial ATA Standard, for example, can be supplied irrespective of whether the host side is in conformity with the same Standard. In this case, it is not necessary to make voltage conversion on the circuit board and hence it is possible to suppress the amount of heat generated and decrease the power consumption.

DETAILED DESCRIPTION OF THE INVENTION

Figure 1:
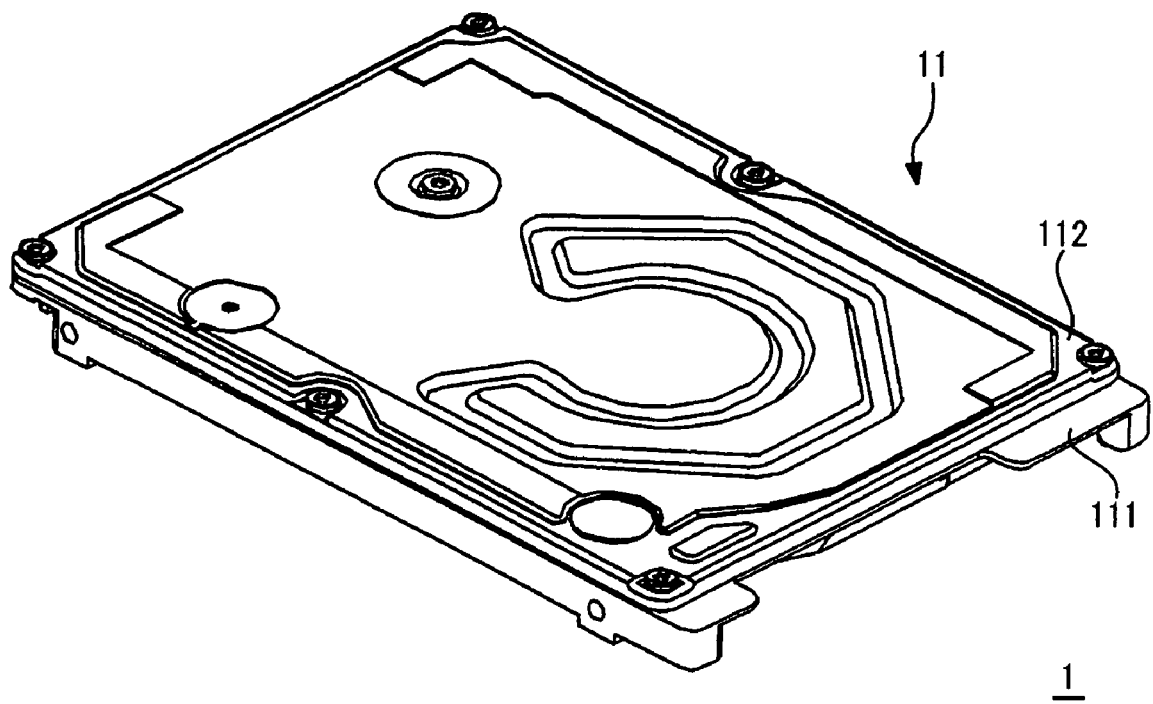
FIG. 1 is an exploded perspective view showing a schematic configuration of an HDD embodying the recording media drive of the present invention.
Figure 1:
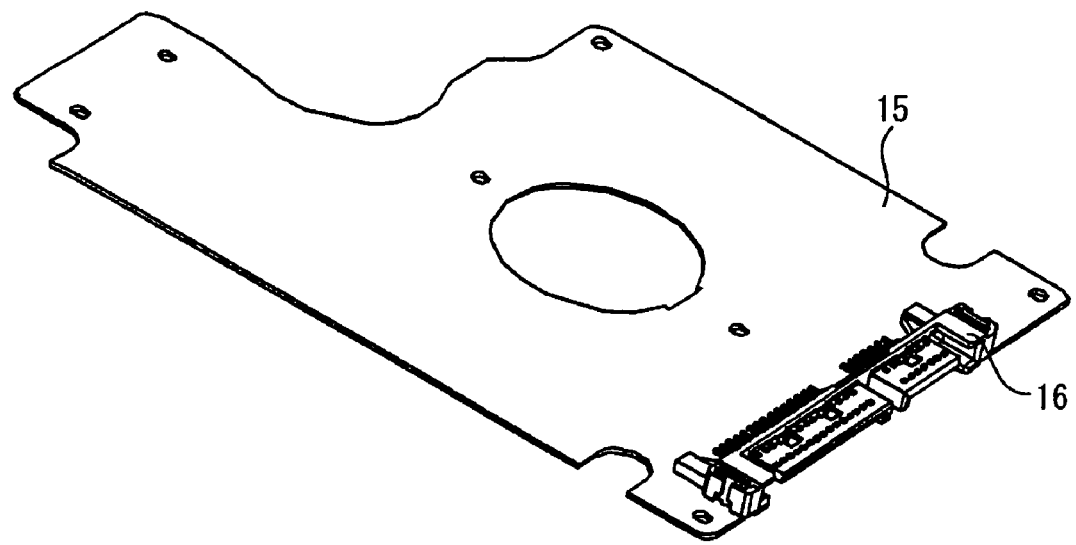

An embodiment of the present invention will be described in detail hereinunder with reference to the accompanying drawings. In this embodiment the present invention is applied to a hard disk drive conforming to Serial ATA Standard.

In Parallel ATA, as described above, only 5V and 12V are defined as supply voltages. On a circuit board mounted on HDD there is mounted a connector which is connected to a host for the reception of voltage from the host and for the transmission and reception of signals between it and the host. In HDD conforming to Parallel ATA, the connector is provided with only power pins for receiving the voltages of 5V and 12V. However, not only electronic parts adapted to operate at 5V and 12V but also an electronic part adapted to operate at 3.3V is mounted on the circuit board. In this case, for the electronic part adapted to operate at 3.3V, the voltage of 5V or 12V supplied from the host is converted to 3.3V by means of a voltage converter or the like provided in the HDD and the voltage of 3.3V after the conversion is supplied to the electronic part.

On the other hand, in Serial ATA, not only the supply of 5V and 12V but also the supply of 3.3V is permitted. Therefore, the connector conforming to Serial ATA Standard is provided with a power pin for the reception of 3.3V. At present, however, many of the hosts for the supply of voltage to HDDs are in conformity with Parallel ATA, in which only 5V and 12V power lines are drawn out from a power segment of each host. That is, on the host side, a 3.3V power line is not laid for the power segment of an HDD. Thus, there are many hosts not having the function of supplying 3.3V to the HDD side.

Therefore, even if an HDD conforming to Serial ATA is connected to such a host, the HDD cannot be supplied with 3.3V from the host. Thus, even in the case of an HDD conforming to Serial ATA and constructed so as to be able to receive 3.3V, there sometimes is the case where 3.3V is not supplied from the host side. Even in such a case, in order to ensure the operation of an electronic part conforming to the voltage of 3.3V, there generally is provided a voltage converter in the interior of the HDD as is the case with Parallel ATA and 5V is thereby converted to 3.3V as in the prior art.

On the other hand, there is a host capable of supplying 3.3V to an HDD. For example, by providing what is called a plug-in type connector on a substrate of a host, the connector being constructed so as to permit direct connection of a Serial ATA Interface connector without the use of cable or the like, it is possible to supply the voltage of 3.3V to an HDD relatively easily. At present, however, there also are many hosts incapable of supplying 3.3V to HDDs. An HDD is compelled to be provided on its circuit board with a voltage converter for the conversion of 5V to 3.3V so that an electronic part adapted to operate at 3.3V is sure to be operated even without the supply of 3.3V from a host.

On the other hand, the HDD of this embodiment is provided on its circuit board with a switching control circuit which detects automatically whether 3.3V is supplied from the exterior or not and which, on the basis of the result of the detection, switches from one voltage supply source to another for an electronic part adapted to operate at 3.3V. More specifically, when 3.3V is not supplied from the exterior, 3.3V is supplied from an internal voltage 3.3V supply segment such as a regulator to an electronic part which requires the supply of 3.3V. On the other hand, when 3.3V can be supplied from the exterior, this is detected automatically and 3.3V is supplied to the electronic part concerned with use of an external voltage 3.3V supply segment. Thus, when 3.3V can be supplied from the exterior, it is not necessary to convert 5V or 12V to 3.3V. Consequently, the power consumption can be decreased to a remarkable extent, as will be described later. Moreover, since it is not necessary to reduce the voltage, it is also possible to suppress the problem of heat generation. Further, since the HDD is provided with the switching control circuit for detecting an external voltage 3.3V automatically, the user can use the HDD without being conscious of whether the host can supply 3.3V or not. This is convenient.

First, reference will be made to an example of a recording media drive according to this embodiment. FIG. 1 is an exploded perspective view showing a schematic configuration of an HDD as an example of the recording media drive of this embodiment. The HDD, indicated at 1, includes an HDD body 11 and a circuit board 15 mounted on the HDD body 11. The HDD body 11 includes various constituent parts accommodated within an enclosure which is composed of a base 111 and a top cover 112. The base 111 is fixed through a gasket (not shown) to the top cover 112 which covers an upper opening of the base 111, and can thereby accommodate the constituent parts of the HDD body 11 in a hermetically sealed state.

A Serial ATA connector 16 conforming to Serial ATA Interface is mounted on the circuit board 15. The Serial ATA connector 16 is disposed on one side of the circuit board 15 and is fixed to the circuit board. A recess is formed in the one side of the circuit board 15 and the Serial ATA connector 16 is fitted in the recess, whereby the Serial ATA connector 16 is fixed to the circuit board 15. Thus, one side of the Serial ATA connector 16 lies along one side of the circuit board 15 and both sides are substantially aligned with each other.

Circuit elements such as various ICs for controlling the HDD body 11 and for controlling the communication of data between a host and the HDD body 11 are mounted on the circuit board 15. For example, such ICs as HDC (Hard Disk Controller)/MPU, read/write channel, and motor driver, are mounted onto the surface on the HDD body 11 side of the circuit board 15, although the circuit elements on the circuit board 15 are omitted in FIG. 1.

Figure 2:
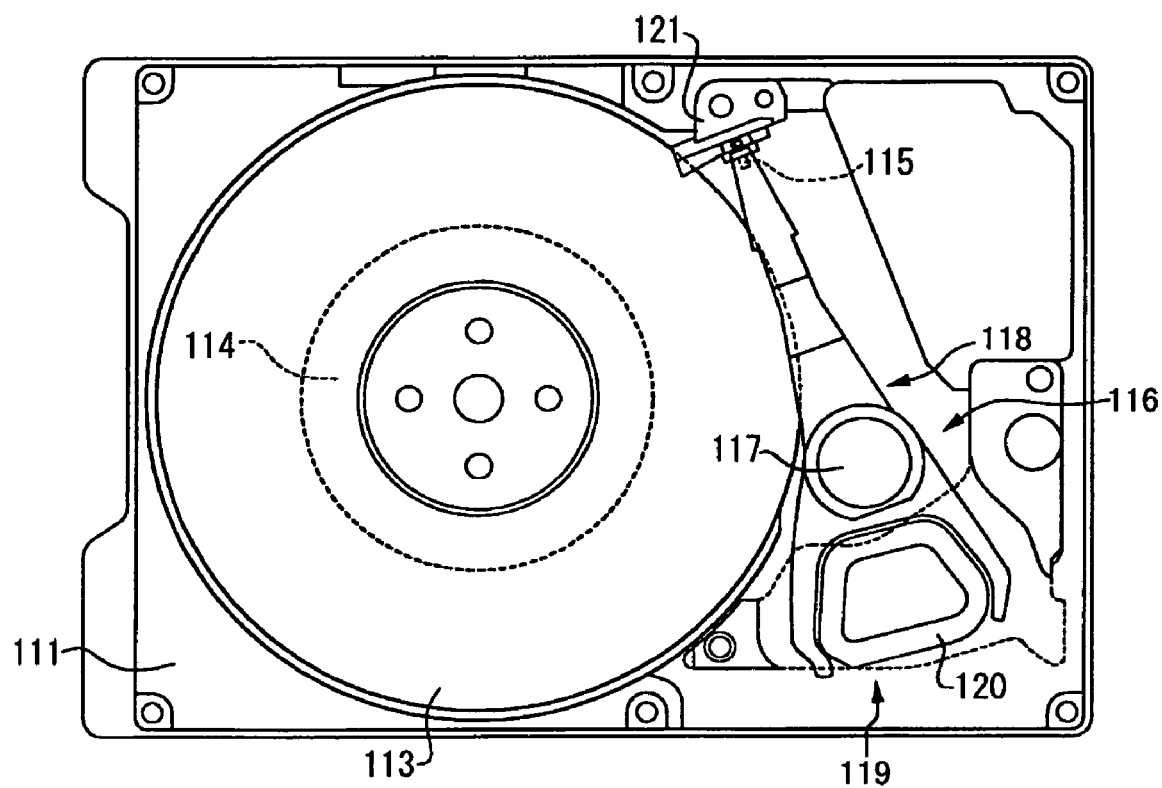
FIG. 2 is a plan view showing schematically an internal configuration of a body of the HDD.

FIG. 2 is a plan view showing a schematic internal configuration of the HDD body 11. In FIG. 2, the numeral 113 denotes a magnetic disk as a non-volatile recording medium which stores data by magnetization of a magnetic layer. The magnetic disk 113 is fixed to a spindle motor 114, which rotates the magnetic disk 113 at a predetermined speed. Numeral 115 denotes a head which writes and/or reads data to and/or from the magnetic disk 113, the data being inputted and outputted between the head and a host (not shown). The head 115 includes a write element for converting an electric signal to a magnetic field in accordance with data to be stored onto the magnetic disk 113 and/or a read element for converting a magnetic field provided from the magnetic disk 113 to an electric signal. The head 115 further includes a slider with the write element and/or the read element formed on a surface thereof.

The head 115 is held by an actuator 116. The actuator 116 is held pivotably by a pivot shaft 117 and includes a carriage 118 and a VCM (voice coil motor) 119. In FIG. 2, a part of the VCM 119 is cut away for convenience sake and the profile thereof is shown with a broken line. In accordance with a drive signal flowing from a circuit on the circuit board 15 to a flat coil 120 the VCM 119 causes the carriage 118 to pivot about the pivot shaft 117, thereby causing the head 115 to move onto the magnetic disk 113 which is rotating.

When the rotation of the magnetic disk 113 stops, the VCM 119 moves the head 115 to the outside of the magnetic disk 113 and the actuator 116 causes the head 115 to be retracted to a ramp mechanism 121 from above the magnetic disk 113. A CSS (Contact Start and Stop) method is also known in which the head 115 is retracted to an inner periphery zone of the magnetic disk 113 when the head 115 does not perform a data write/read processing. Though not shown in FIG. 1, the HDD body 11 includes a plurality of stacked magnetic disks, and typically data are stored on both surfaces of each magnetic disk. Further, plural heads each corresponding to a recording surface of each magnetic disk are held by the actuator 116.

Figure 3:
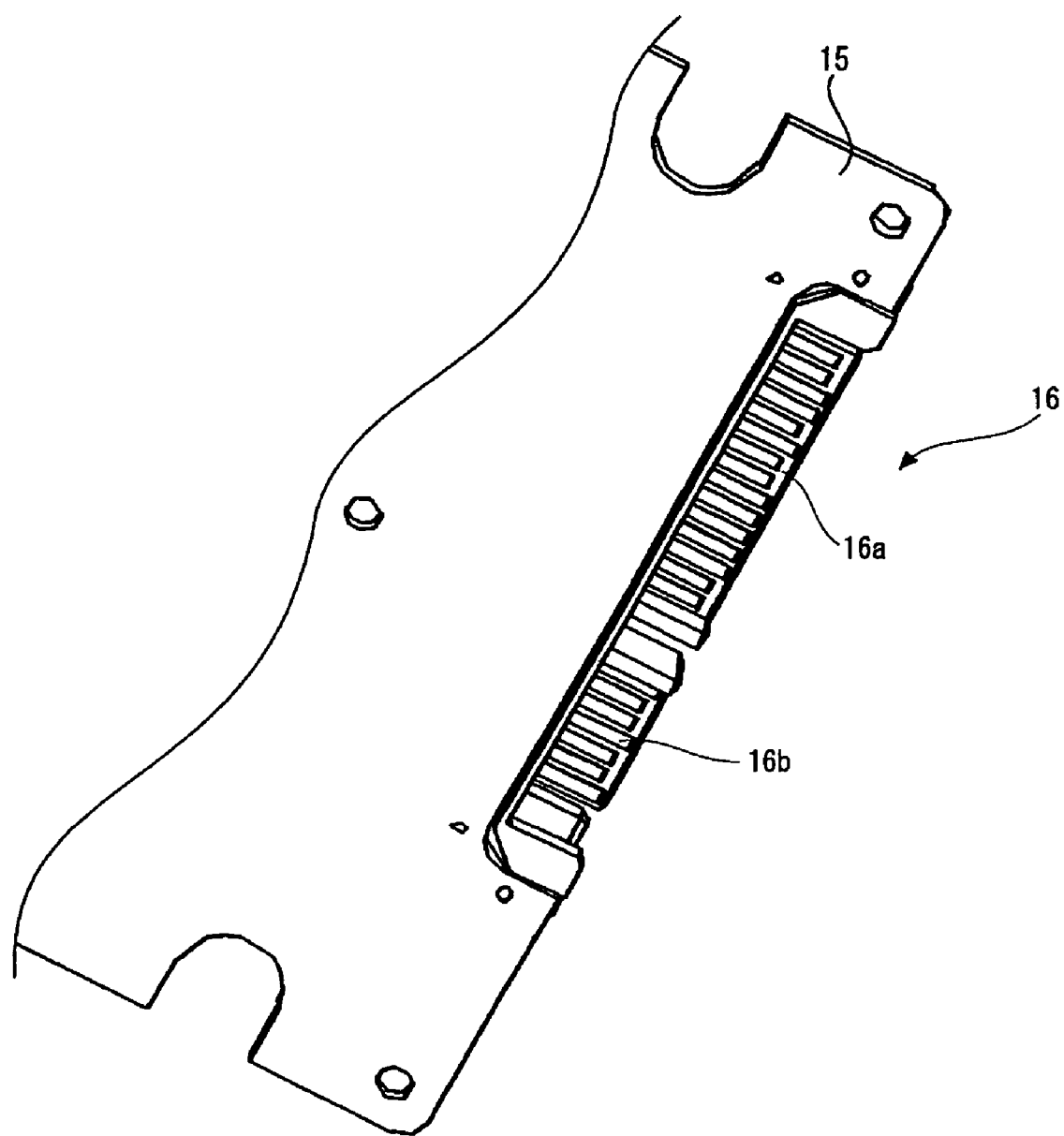
FIG. 3 is a perspective view as seen from the side opposite to a base, showing a connection of a circuit board with a host, the circuit board being mounted on the HDD body.

Next, a description will be given of the Serial ATA connector 16 mounted on the circuit board 15. FIG. 3 is a perspective view which shows a connection of the circuit board 15 with a host and which is seen from the side opposite to the base 111, and FIG. 4 is a perspective view showing a mounted state of the circuit board 15 on the HDD body 11.

As shown in FIG. 3, the Serial ATA connector 16 includes a signal segment 16a for the exchange of signals with respect to the host and a power segment 16b for the supply of electric power from the host. As noted earlier, the power segment 16b of the Serial ATA connector 16 includes power pins corresponding to supply voltages of 3.3V, 5V, and 12V so that those voltages can be supplied from the exterior such as the host to the circuit board 15.

Figure 4:
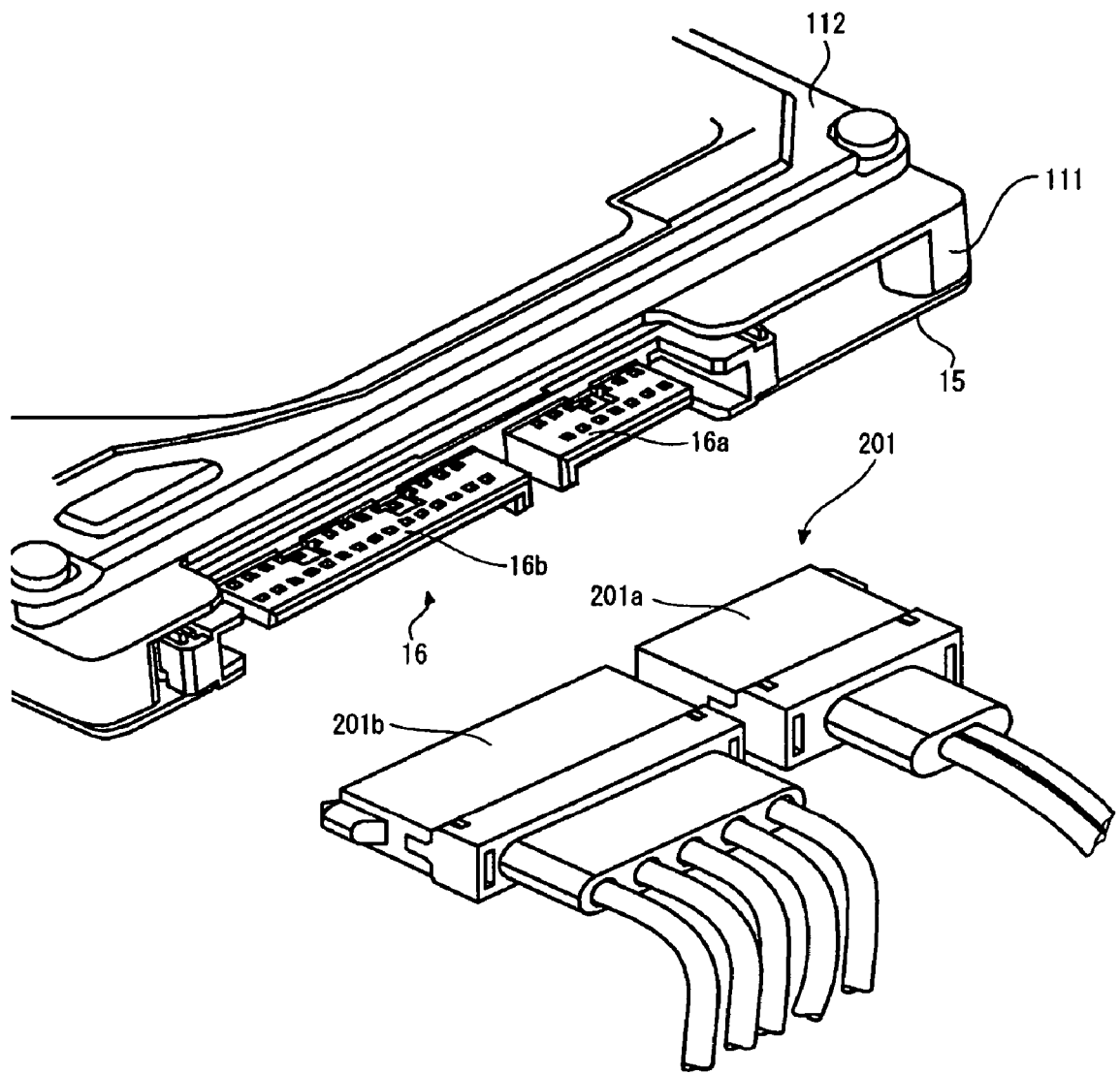
FIG. 4 is a perspective view showing a mounted state of the circuit board on the HDD body.

In the case where a host-side female connector 201 shown in FIG. 4 is a connector conforming to Serial ATA Interface, the female connector 201 also includes a signal segment 201a for the exchange of signals and a power segment 201b for the supply of electric power, which are connected to the signal segment 16a and the power segment 16b, respectively, of the Serial ATA connector 16. The power segment 201b of the female connector 201 connected to the Serial ATA connector 16 includes power pins capable of supplying three types of voltages 3.3V, 5V, and 12V. Thus, by connecting such a female connector 201 as conforms to Serial ATA Interface to the Serial ATA connector 16, three types of voltages 3.3V, 5V, and 12V can be supplied from the host to the circuit board 15.

Figure 5:
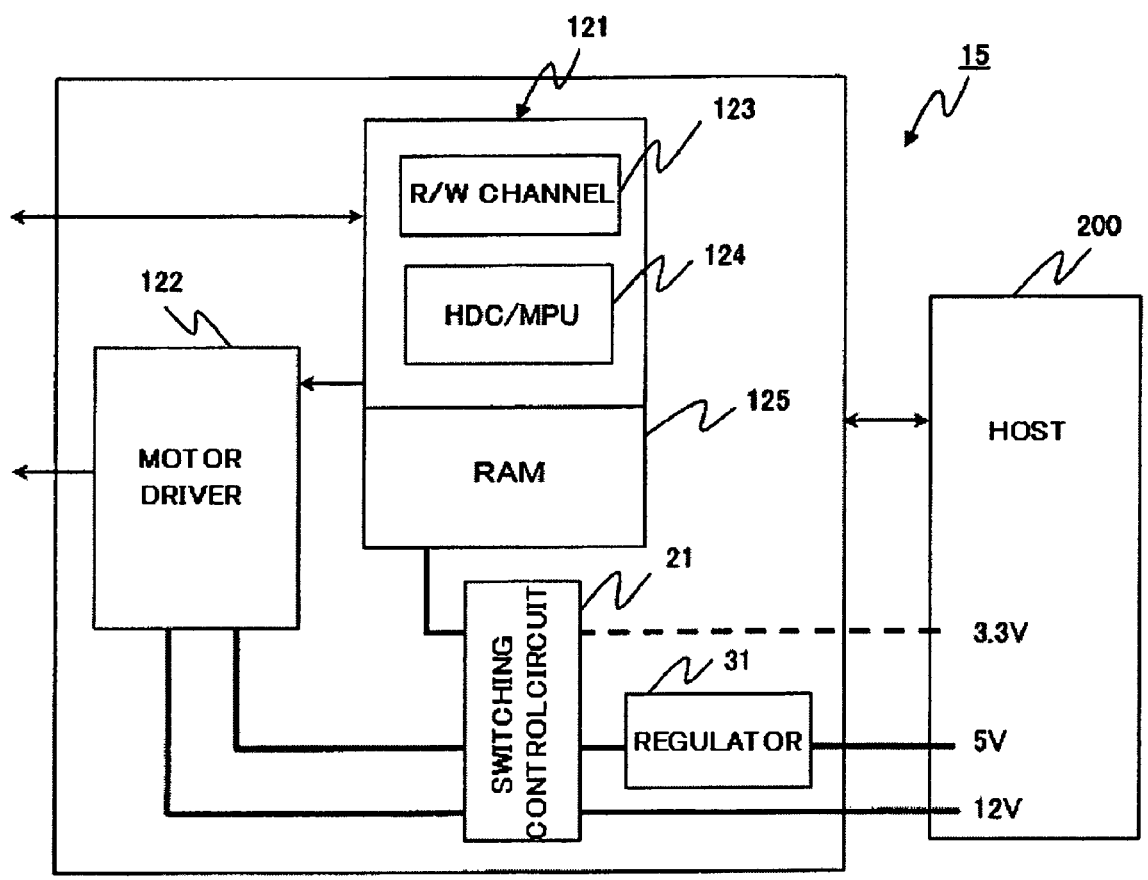
FIG. 5 is a diagram showing an example of a circuit configuration in the circuit board.

FIG. 5 is a circuit diagram showing the circuit board 15. The circuit board 15 includes a motor driver unit 122 and a signal processing circuit 121 for the exchange of signals between it and an arm electronic circuit (Arm Electronics: AE) (not shown) and also between it and an external host 200. The signal processing circuit 121 includes a read/write channel (R/W channel) 123, a hard disk controller (HDC)/MPU integrated circuit ("HDC/MPU" hereinafter) 124, and a RAM 125 as an example of memory. The R/W channel 123 and HDC/MPU 124 are constituted by a single package together with the RAM 125.

Write data provided from the external host 200 is received by the HDC/MPU 124, then is fed to the head 115 through the R/W channel 123, and is thereby written to the magnetic disk 113. On the other hand, the data stored in the magnetic disk 113 is read by the head 115 and is outputted from the HDC/MPU 124 to the external host 200 through the R/W channel 123.

The R/W channel 123 executes a write processing for the data acquired from the host 200. In the write processing, the R/W channel 123 code-modulates the write data fed from the HDC/MPU 124, then converts the thus code-modulated write data into a write signal (current) and provides it to the AE. Further, for the supply of data to the host, the R/W channel 123 performs a read processing.

In the read processing, the read/write channel 123 amplifies a read signal fed from the head 115 through AE into a constant amplitude, then extracts data from the acquired read signal and performs a processing for decoding. Data which is read out includes both user data and servo data. The read data having been subjected to decoding is fed to the HDC/MPU 124.

The HDC/MPU 124 operates in accordance with a microcode loaded into the RAM 125 and performs an entire control for the HDD 11 such as generating a position error signal from burst data and controlling the position of the head 115, performing an interface control and making defect management. In addition, the HDC/MPU 124 executes necessary processings related to data processing. Upon start-up of the HDD 11, not only the microcode which operates on the MPU but also data necessary for control and data processing are loaded into the RAM 125 from the magnetic disk 111 or from a ROM (not shown).

The HDC/MPU 124 has an interface function between it and the host and receives user data and read and write commands transmitted from the host 200. The received user data is transferred to the R/W channel 123. Moreover, the HDC/MPU 124 transmits data read from the magnetic disk 113 and acquired from the R/W channel 123 to the host 200. Further, the HDC/MPU 124 executes a processing for error correction (ECC) with respect to user data acquired from the host or read from the magnetic disk 111. The data read by the R/W channel 123 includes not only user data but also servo data. Using the servo data, the HDC/MPU 124 performs a positioning control for the head 115 and controls the data read/write processing. Control data provided from the HDC/MPU 124 is outputted to the motor driver unit 122, which in turn controls VCM and SPM in accordance with the control signal.

The circuit board 15 required the foregoing three types of direct supply voltages, i.e., 3.3V, 5V, and 12V, and the electronic components mounted thereon operate by being supplied with respective voltages. For example, an output stage of the motor driver unit 122 operates at 12V, while an input stage thereof operates at 5V, and the signal processing circuit having R/W channel 123, HDC/MPU 124 and RAM 125 operates at 3.3V.

If the host 200 is constructed so as to be connected to an HDD conforming to Parallel ATA as in the prior art, its female connector is not provided with a power pin for the supply of 3.3V. Therefore, even with a connector for parallel to serial conversion connected, the connector is not connected to a 3.3V supply line and hence 3.3V cannot be fed to the Serial ATA connector 16 referred to above. In order that 3.3V can be ensured even in such a case, the circuit board 15 is provided with an internal voltage 3.3V supply segment which generates 3.3V from, for example, a 5V supply segment. In this embodiment, as the 3.3V supply segment there is provided a regulator 31 which converts 5V to 3.3V. However, the internal voltage 3.3V supply segment is not limited to the regulator, but may be, for example, a DC-DC converter or may be one which generates an internal voltage of 3.3V from an external voltage of 12V.

When 3.3V is supplied from the exterior, the circuit board 15 used in this embodiment supplies this external voltage of 3.3V to the signal processing circuit 121, while when 3.3V is not supplied from the exterior, the circuit board 15 converts 5V fed from the host 200 to 3.3V and provides the 3.3V to the signal processing circuit 121. To this end, the circuit board 15 includes a switching control circuit 21 which detects automatically whether 3.3V can be supplied from the host 200 or not and which on the basis of the result of this detection makes a switching control as to whether the external 3.3V is to be fed to the signal processing circuit 121 or the 3.3V provided from the regulator 31 is to be fed to the signal processing circuit. Upon detecting that 3.3V can be supplied from the exterior, the switching control circuit 21 switches the power line connected to the signal processing circuit 121 to a power line (not shown) for the supply of external 3.3V.

Also in the conventional HDD wherein a connector conforming to Parallel ATA Interface is mounted, an information processing circuit which comprises a logic circuit such as R/W channel or MPU mounted on the circuit board 15 is provided with an electronic part adapted to operate at 3.3V. Therefore, the conventional circuit board 15 on which a connector conforming to Parallel ATA Interface is mounted is sure to be provided with an internal voltage 3.3V supply segment, whereby 3.3V is produced from 5V or 12V fed from the host.

Figure 6:
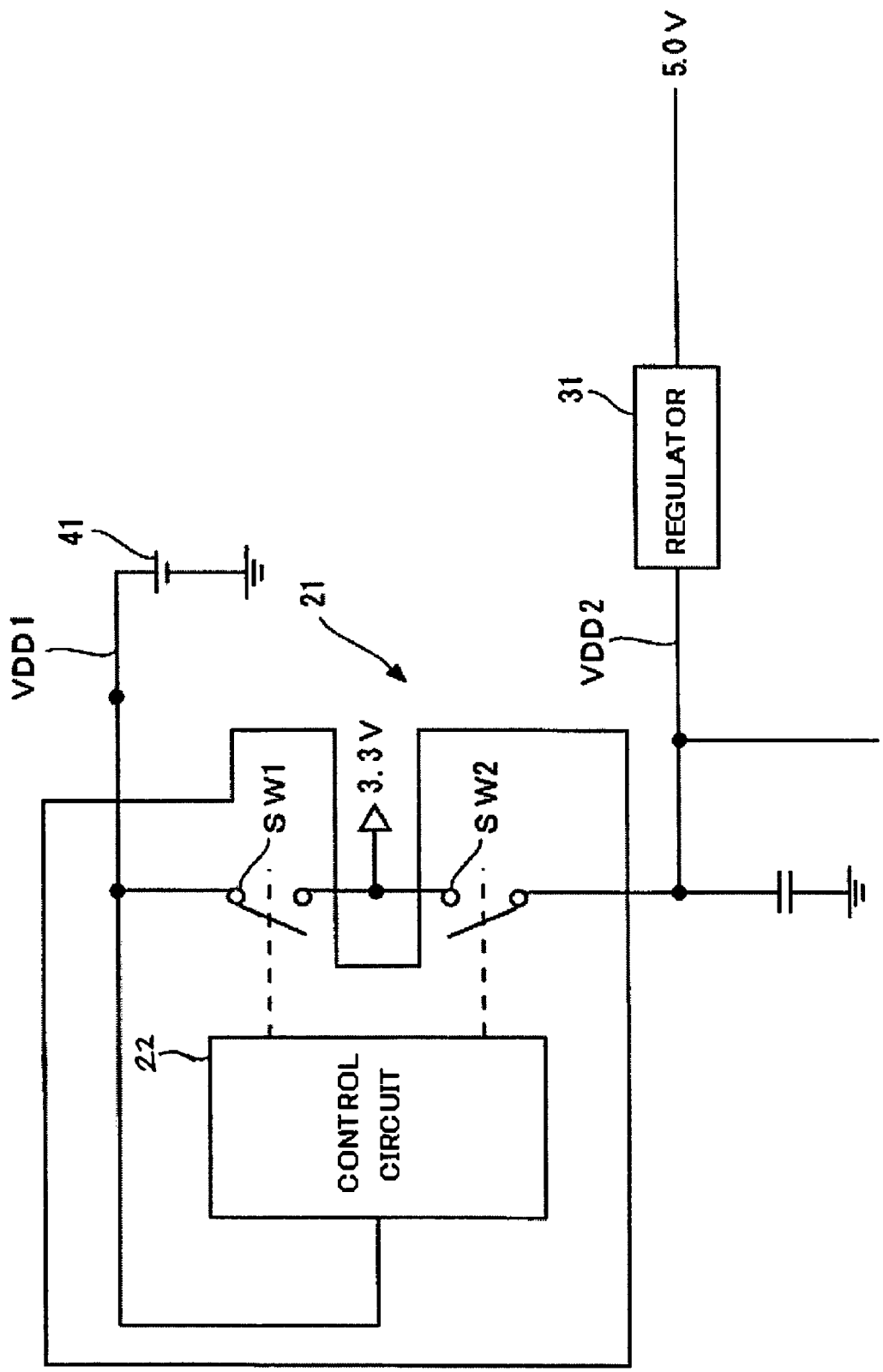
FIG. 6 is a block diagram showing a switching control circuit mounted on the circuit board of the HDD according to the embodiment.

As described above, even in the case where the circuit board 15 uses the Serial ATA connector 16, there occur a case where 3.3V is supplied from the exterior and a case where 3.3V is not supplied from the exterior, depending on whether the host 200 is in conformity with Serial ATA or not. A still more detailed description will now be given about the switching control circuit on the circuit board used in this embodiment. The control circuit is for allowing the circuit board 15 to operate normally in both of the above cases. According to the circuit board 15 used in this embodiment, not only the operation of an electronic part adapted to operate at 3.3V on the circuit board 15 is ensured by the switching control circuit 21, but also, when 3.3V is supplied from the exterior, it is utilized effectively, thereby attaining a lower power consumption and the reduction of the amount of heat generated. FIG. 6 is a block diagram showing the switching control circuit mounted on the circuit board of the HDD according to this embodiment.

As described above, the Serial ATA connector 16 referred to above is mounted on the circuit board 15 shown in FIG. 4 and is connected to the female connector 201, the female connector 201 being connected to an external voltage 5V supply segment and also to an external voltage 12V supply segment both provided on the host side. As shown in FIG. 6, the circuit board 15 includes the regulator 31 which generates an internal voltage of 3.3V from the external voltage of 5V supplied through the Serial ATA connector.

The circuit board includes the foregoing information processing circuit ("electronic part" hereinafter) capable of being supplied with the internal voltage of 3.3V from the regulator 31 and the switching control circuit 21 for switching from one voltage supply segment to another for the electronic part. In the case where the connector mounted on the circuit board is constructed so as to be connectable to an external voltage 3.3V supply segment 41 for the supply of the external voltage 3.3V like the Serial ATA connector and when it was connected to the external voltage 3.3V supply segment 41, that is, when the host concerned is in conformity with Serial ATA, the switching control circuit 21 detects that the external voltage of 3.3V can be supplied. The switching control circuit 21 then makes control for switching to the power line connected to the electronic part concerned so that the external 3.3V is supplied to the electronic part on the circuit board.

More specifically, as shown in FIG. 6, the switching control circuit 21 is connected to a first power line VDD1 for the supply of the external voltage 3.3V through the Serial ATA connector and also connected to a second power line VDD2 for the supply of the internal voltage 3.3V from the regulator 31. The switching control circuit 21 includes a first switch SW1 for connection between the electronic part and the first power line VDD1, a second switch SW2 for connection between the electronic part and the second power line VDD2, and a control circuit 22 for controlling ON-OFF of the first and second switches SW1 and SW2.

When the control circuit 22 detects connection with the external 3.3V supply segment 41, it turns ON the switch SW1 and turns OFF the switch SW2. As a result, the external voltage 3.3V supply segment 41 and the electronic part are connected together through the first power line VDD1 and the voltage of 3.3V is supplied directly from the external voltage 3.3V supply segment 41 to the electronic part.

On the other hand, when the connection with the external voltage 3.3V supply segment 41 is not detected, the switch SW1 is turned OFF and the switch SW2 is turned ON. As a result, the regulator 31 and the electronic part are connected together through the second power line VDD2 and 3.3V is supplied from the regulator 31. Thus, the circuit board 15 not only can provide 3.3V to the electronic part irrespective of whether the electronic part is connected to the external voltage 3.3V supply segment 41 or not, but also, upon detection of connection with the external voltage 3.3V supply segment 41, the control circuit 22 on the circuit board 15 turns ON the switch SW1 so as to utilize the external voltage of 3.3V effectively. As a result, 3.3V is supplied directly from the external voltage 3.3V supply segment 41, whereby not only the voltage conversion by the regulator 31 is made unnecessary and hence the generation of heat caused by the voltage conversion can be made zero, but also the power consumption can be decreased by eliminating such a waste as generates 3.3V from 5V.

Figure 7:
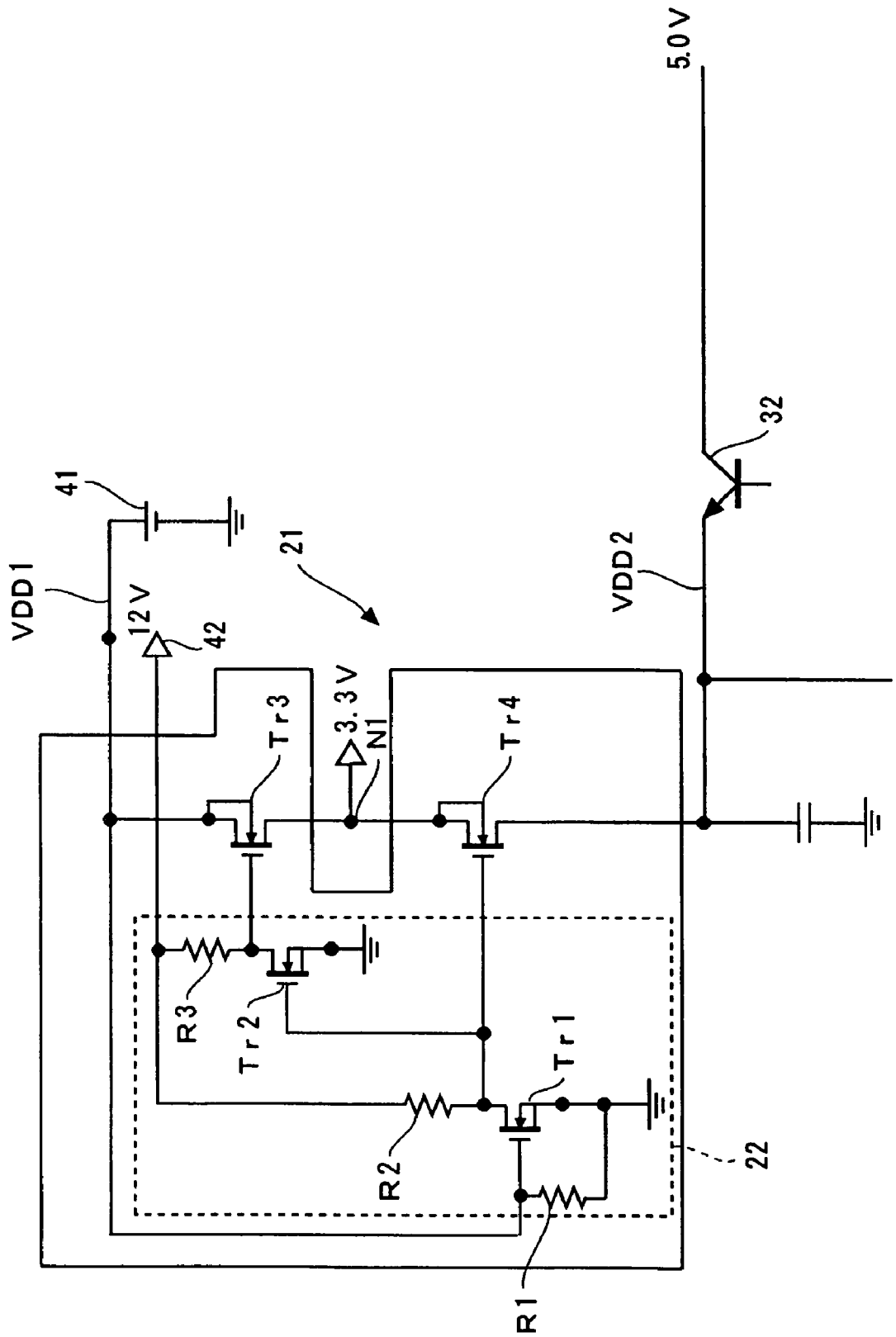
FIG. 7 is a circuit diagram showing the switching control circuit in more detail.

FIG. 7 is a circuit diagram showing the switching control circuit 21 in more detail. As shown in FIG. 7, the switches SW1 and SW2 of the switching control circuit 21 may be transistors Tr3 and Tr4, respectively, which are N-channel MOS (metal-oxide semiconductor) transistors for example. Further, the control circuit 22 includes a transistor Tr1 as a first transistor which is, for example, an N-channel MOS transistor and a transistor Tr2 as a second transistor which is, for example, an N-channel MOS transistor. The transistor Tr1 is connected at its gate to the power line VDD1 which is connected to the external voltage 3.3V supply segment 41, and is ON-OFF controlled, while the transistor Tr2 is connected at its gate to the drain of the transistor Tr1 and is ON-OFF controlled in accordance with ON-OFF of the transistor Tr1.

The transistor Tr3 serving as the switch SW1 is connected at its gate to the drain of the transistor Tr2 and is ON-OFF controlled in accordance with ON-OFF of the transistor Tr2. The transistor Tr4 serving as the switch SW2 is connected, together with the gate of the transistor Tr2, to the drain of the transistor Tr1 and is ON-OFF controlled in accordance with ON-OFF of the transistor Tr1.

That is, the gate of the transistor Tr1 is connected to the first power line VDD1, the source thereof is connected to the ground GND, and the drain thereof is connected to the gate of the transistor Tr4. The gate and source of the transistor Tr1 are connected to each other through a resistor R1. The drain of the transistor Tr1 is connected through a resistor R2 to an external voltage 12V supply segment 42 provided on the host side. The external voltage 12V supply segment 42 may be substituted, for example, by an external voltage 5V supply segment.

The gate of the transistor Tr2 is connected to the drain of the transistor Tr1, the source thereof is connected to the ground GND, and the drain thereof is connected to the gate of the transistor Tr3. The drain of the transistor Tr2 is also connected to the external voltage 12V supply segment 42 through a resistor R3.

The drain of the transistor Tr3 is connected to the first power line VDD1 and the source thereof is connected to the drain of the transistor Tr4. The source of the transistor Tr4 is connected to the second power line VDD2. From a contact N1 of the source of the transistor Tr3 and the drain of the transistor Tr4, an external voltage of 3.3V is outputted upon turning ON of the transistor Tr3 and an internal voltage of 3.3V is outputted upon turning ON of the transistor Tr4.

The operation of the switching control circuit 21 thus constructed will now be described. Reference will first be made to the case where 3.3V is supplied from the external voltage 3.3V supply segment 41. When the switching control circuit 21 is connected to the external voltage 3.3V supply segment 41, an external voltage of 3.3V is applied to the gate of the transistor Tr1 from the first power line VDD1, turning ON the transistor Tr1. That is, the transistor Tr1 is adapted to turn ON when supplied with the external voltage of 3.3V and turn OFF when not supplied with the external voltage of 3.3V, thus functioning as a detecting element for detecting whether the external voltage of 3.3V can be supplied or not.

Since the source of the transistor Tr1 is connected to ground, the transistors Tr2 and Tr4 whose gates are connected to the drain of the transistor Tr2 are both turned OFF. On the other hand, the transistor Tr3 whose gate is connected to the first power line VDD1 through the resistor R3 is turned ON, whereby the voltage of the power line VDD1 connected to the drain of the transistor Tr3, i.e., the external voltage of 3.3V, appears at the contact N1.

On the other hand, when the switching control circuit 21 is not connected to the external voltage 3.3V supply segment 41, that is, when means for the supply of 3.3V is not provided on the host side, the transistor Tr1 is turned OFF. With the transistor Tr1 OFF, the transistor Tr2 whose gate is connected to the first power line VDD1 through the resistor R2 is turned ON and the drain thereof becomes the ground level. The transistor Tr3 whose gate is connected to the drain of the transistor Tr2 is turned OFF.

Like the transistor Tr2, the transistor Tr4 whose gate is connected to the first power line VDD1 through the resistor R2 is also turned ON, so that the internal voltage of 3.3V is supplied to the source of the transistor Tr4 through the power line VDD2 and the potential of the contact N1 becomes 3.3V.

In this way, when 3.3V is supplied from the external voltage 3.3V supply segment 41, the external voltage of 3.3V appears at the contact N1, while when the external voltage of 3.3V is not supplied from the external voltage 3.3V supply segment 41, the internal voltage of 3.3V provided from the regulator 31 which is the internal voltage 3.3V supply segment appears at the contact N1.

In this embodiment, since the control circuit 22 on the circuit board 15 detects automatically whether the external voltage of 3.3V is supplied or not, the HDD user, when using the HDD, is not required to make sure whether 3.3V can be supplied from the exterior or not.

That is, in accordance with Serial ATA Standard, the connector conforming to the standard is provided with a connecting pin for connection to the 3.3V power line. However, when 3.3V supply mechanism is not provided on the host side, there may be a case where 3.3V cannot be supplied from the exterior. In the circuit board 15, therefore, the electronic part adapted to operate at 3.3V cannot be operated unless 3.3V is obtained by conversion from another external voltage. In this case, for making the circuit board operate positively irrespective of whether the host side is in conformity with Serial ATA or not, the simplest method may be obtaining 3.3V by voltage conversion from another external voltage.

When the voltage of 3.3V can be supplied from the host side, a direct supply of 3.3V from the exterior is preferable to an internal voltage conversion because the power consumption can be decreased. Therefore, when all of these demands are to be satisfied, there arises the necessity of providing an HDD after checking whether the host side is in conformity with Serial ATA or not. In this case, for example in compliance with the user's request, a jumper switch for connection between the first power line VDD1 and a power line of the electronic part adapted to operate at 3.3V is provided as an assembly option in the manufacturing stage and there is provided a dedicated HDD which can use the external voltage of 3.3V through the jumper switch.

The above method requires an additional working step of changing the setting of the circuit board of the HDD by the host and there is a fear that a new problem may arise such as a malfunction is caused by an erroneous setting. Further, in the event the user should connect by mistake such an HDD to a host incapable of supplying 3.3V, the external voltage of 3.3V is not supplied and therefore 3.3V is not supplied to an electronic part adapted to operate at 3.3V, with consequent occurrence of an inconvenience such as a malfunction of a circuit.

On the other hand, the circuit board 15 used in this embodiment has a function of automatically detecting the supply of 3.3V from the exterior, is constructed so as to permit the supply of 3.3V from the external voltage 3.3V supply segment, and is provided with a voltage converter (an internal voltage supply segment) for conversion from a voltage other than 3.3V to 3.3V. Consequently, whether an external voltage of 3.3V is supplied or not is detected and, on the basis of the result of the detection, it is possible to automatically select whether voltage conversion is to be made by the voltage converter as the internal voltage 3.3V supply segment or 3.3V is to be supplied from the host side. Therefore, on the user side and in the HDD manufacturing stage, it is not necessary to make any special setting for the HDD to be supplied with 3.3V from the host side.

The switching control circuit 21 for controlling an automatic switching of such a power supply segment may be of an extremely simple configuration using, for example, only four transistors and several resistors. Further, the electric power which the switching control circuit 21 consumes is extremely low, e.g., less than 1 mW, and thus the same circuit is applicable suitably to an integrated circuit with MOS transistors mounted thereon.

When 3.3V can be supplied directly, the amount of heat generated in the entire device decreases because voltage conversion is not needed. For example, in case of using HDDs as servers, there sometimes is a case where several ten HDDs operate simultaneously. In such a case, the reduction in the amount of heat generated is very effective.

Further, a comparison is here made between the case where an internal voltage of 3.3V is generated from an external voltage of 5V by a conventional method using a regulator which utilizes a transistor for example and the case where 3.3V is supplied directly from a host. According to this comparison, in the latter case, i.e., in the direct supply of 3.3V, the total electric power can be decreased about 10% on the average of the whole. Moreover, in read/write operation in which the number of times of operation of a logic circuit adapted to operate at 3.3V increases, it is possible to attain a decrease of about 15% of the total electric power. Further, in a sleep mode in which the normal operation is interrupted, it is possible to decrease about 34% of the total electric power.

It goes without saying that the present invention is not limited to the above embodiment, but that various changes may be made within the scope not departing from the gist of the present invention. For example, although in the above embodiment reference has been made to the HDD with a connector conforming to Serial ATA Interface mounted thereon as an example of the magnetic media drive, the present invention is also applicable to even other HDDs of the serial communication type, as well as other types of read devices, write devices, read/write devices, or information processing apparatuses, including a read only device which performs only the read of data and an optical storage device which processes stored data optically. That is, for an electronic device including plural types of electronic parts adapted to operate at different voltages and constructed so as to permit an external supply of even such a voltage as can be provided in the interior and cannot be predicted its supply from the exterior, the same effects as in the above embodiment can be attained by the provision of the same switching control circuit as in the above embodiment.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A recording media drive comprising a recording media drive body; and a circuit board mounted on said recording media drive body, said circuit board comprising:
    a connector configured to be connected to a first external voltage supply segment for the supply of a first external voltage and capable of being connected to a second external voltage supply segment for the supply of a second external voltage;
    a second internal voltage supply segment which generates a second internal voltage from the first external voltage supplied through said connector;
    an external voltage detecting element to detect whether said second external voltage is supplied or not;
    an electronic part configured to operate at a second voltage; and
    a switching control circuit which makes control so as to supply said second voltage to said electronic part from either said first external voltage supply segment or said second external voltage supply segment,
    wherein said switching control circuit makes a switching control so that said second external voltage is supplied to said electronic part upon detecting the connection of said connector to said second external voltage supply segment.

2. A recording media drive according to claim 1, wherein said second internal voltage supply segment generates said second internal voltage from said first external voltage or a third external voltage.

3. A recording media drive according to claim 2, further comprising another electronic part configured to operate at said third external voltage.

4. A recording media drive according to claim 1, further comprising another electronic part configured to operate at said first external voltage.

5. A recording media drive comprising a recording media drive body; and a circuit board mounted on said recording media drive body, said circuit board comprising:
    a connector configured to be connected to an external voltage 5V supply segment and an external voltage 12V supply segment and capable of being connected to an external voltage 3.3V supply segment;
    an internal voltage 3.3V supply segment which generates 3.3V from either an external voltage 5V or 12V supplied through said connector;
    an external voltage detecting element to detect whether said external voltage 3.3V is supplied or not;
    an electronic part configured to operate at 3.3V; and
    a switching control circuit which makes control so as to supply 3.3V to said electronic part from either said external voltage 3.3V supply segment or said internal voltage 3.3V supply segment,
    wherein said switching control circuit makes a switching control so that said external voltage 3.3V is supplied to said electronic part upon detecting the connection of said connector to said external voltage 3.3V supply segment.

6. A recording media drive according to claim 5, further comprising:
    a first power line to which said external voltage 3.3V is supplied through said connector; and
    a second power line to which said internal voltage 3.3V is supplied from said internal voltage 3.3V supply segment, and
    wherein said switching control circuit comprises a first switch for connection between said electronic part and said first power line, a second switch for connection between said electronic part and said second power line, and a control circuit configured to control ON-OFF of said first and second switches.

7. A recording media drive according to claim 6, wherein said control circuit controls ON-OFF of said first and second switches on the basis of the result of the detection performed by said external voltage detecting element.

8. A recording media drive according to claim 6, wherein said control circuit comprises a first transistor which is ON-OFF controlled in accordance with whether said external voltage 3.3V is supplied or not and a second transistor which is ON-OFF controlled by said first transistor, said first and second transistors controlling the second and first switches, respectively.

9. A recording media drive according to claim 6, wherein said first and second switches are a third transistor and a fourth transistor, respectively, which are connected in series between said first and second power lines, said first transistor has a control terminal to which said first power line is connected and has one end to which control terminals of said second and fourth transistors are connected, said second transistor has one end to which a control terminal of said first transistor is connected, and said external voltage 3.3V or said internal voltage 3.3V is outputted from a connection point between said third and fourth transistors.

10. A recording media drive according to claim 5, wherein said internal voltage 3.3V supply segment generates said internal voltage 3.3V from said external voltage 5V.

11. A recording media drive according to claim 5, wherein said connector is a connector conforming to Serial ATA Interface.

12. A recording media drive comprising a recording media drive body; and a circuit board mounted on said recording media drive body, said circuit board comprising:

a connector configured to be connected to an external voltage 5V supply segment and an external voltage 12V supply segment and capable of being connected to an external voltage 3.3V supply segment;

an internal voltage 3.3V supply segment which generates 3.3V from either an external voltage 5V or 12V supplied through said connector;

an electronic part configured to operate at 3.3V;

a first power line configured to be connected to said external voltage 3.3V supply segment through said connector;

a second power line configured to be connected to said internal voltage 3.3V supply segment;

a first switch having an ON-OFF control terminal connected to said first power line;

a second switch configured to be ON-OFF controlled by said first switch;

a third switch for connecting said electronic part and said first power line with each other; and a fourth switch for connecting said electronic part and said second power line with each other, said third switch being ON-OFF controlled by said second switch, and said fourth switch being ON-OFF controlled by said first switch.

13. A recording media drive according to claim 12, further comprising another electronic part configured to operate at 5V voltage.

14. A recording media drive according to claim 12, further comprising another electronic part configured to operate at 12V voltage.

15. A recording media drive according to claim 12, wherein said connector is a connector conforming to Serial ATA Interface.

* * * * *

UNITED STATES PATENT AND TRADEMARK OFFICE
CERTIFICATE OF CORRECTION

PATENT NO.       : 7,581,123 B2
APPLICATION NO. : 11/228860
DATED            : August 25, 2009
INVENTOR(S)      : Masaru Fukuta It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 896 days.

Signed and Sealed this

Fourteenth Day of September, 2010

David J. Kappos
*Director of the United States Patent and Trademark Office*